(12) United States Patent
Albrecht et al.

(10) Patent No.: US 11,205,425 B2
(45) Date of Patent: *Dec. 21, 2021

(54) INTEGRATING LOGIC SERVICES WITH A GROUP COMMUNICATION SERVICE AND A VOICE ASSISTANT SERVICE

(71) Applicant: Orion Labs, San Francisco, CA (US)

(72) Inventors: Greg Albrecht, San Francisco, CA (US); Ellen Juhlin, San Francisco, CA (US); Jesse Robbins, San Francisco, CA (US); Justin Black, San Francisco, CA (US)

(73) Assignee: Orion Labs, Inc., San Francisco, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/422,276

(22) Filed: May 24, 2019

(65) Prior Publication Data

US 2020/0372909 A1 Nov. 26, 2020

(51) Int. Cl.
*G10L 15/22* (2006.01)
*H04L 12/58* (2006.01)

(52) U.S. Cl.
CPC ............ *G10L 15/22* (2013.01); *H04L 51/046* (2013.01); *G10L 2015/223* (2013.01)

(58) Field of Classification Search
USPC .................. 704/246, 247, 251, 252, 275
See application file for complete search history.

(56) References Cited

U.S. PATENT DOCUMENTS

| 2013/0066636 A1* | 3/2013 | Singhal | H04R 1/32 |
| | | | 704/275 |
| 2015/0304370 A1* | 10/2015 | Maytal | H04L 12/185 |
| | | | 370/260 |
| 2018/0357878 A1* | 12/2018 | Shapiro | H05K 5/0086 |

* cited by examiner

*Primary Examiner* — Leonard Saint Cyr

(57) ABSTRACT

Methods, apparatuses, and computing systems are provided for integrating logic services with a group communication service. In an implementation, a method may include receiving a spoken message from a communication node in a communication group and determining that the spoken message relates to a logic service and transferring the spoken message to a voice assistant service with an indication that the spoken message relates to the logic service. The method also includes receiving status information from the logic service indicative of a status of a networked device associated with the logic service. The further method includes sending an audible announcement to the communication nodes in the commutation group expressive of the status of the networked device.

20 Claims, 6 Drawing Sheets

INTEGRATING LOGIC SERVICES WITH A GROUP COMMUNICATION SERVICE AND A VOICE ASSISTANT SERVICE

RELATED APPLICATIONS

This application is related to and claims priority to U.S. Provisional Patent Application 62/676,785, titled "INTEGRATING LOGIC SERVICES WITH A GROUP COMMUNICATION SERVICE AND A VOICE ASSISTANT SERVICE," filed May 25, 2018, and which is hereby incorporated by reference in its entirety.

BACKGROUND

Group communication services facilitate secure communications between multiple user nodes in a distributed communication environment. Communication among members of a defined group can be enabled using distributed end user devices. A user may be a member of multiple groups. In addition, a user may be associated with the same or a different device in each group. For example, a user may be in a home group using her mobile device, and the same user may be in another group using her work laptop.

In addition to group communication services, users may use different applications and services in conjunction with their devices. One such service, is a logic service, using a logic service, users can define rules that operate and connect their devices and services. Logic services provide software that connect apps, devices, and services in order to trigger one or more automations involving these apps, devices, and services. For example, a user may use a logic service to automate logging calls in a spreadsheet (i.e. if you make a call on your phone, then log that call in a spreadsheet). If the user also desires to log received calls, those calls may be logged in the same or a different spreadsheet. In another example, a user may set the garage door to open/close when the user is a certain distance from home.

Recently virtual or voice assistant services have become increasingly popular. Voice assistant services may be software agents that can perform tasks or services. Users may interact with the virtual or voice assistant service via text, voice or other means. Virtual or voice assistants use natural language processing (NLP) to match the inputted text and/or voice to executable commands Many such services also include machine learning. Voice assistant services may be accessed using proprietary devices and, in some instances, may be integrated with other devices. In some implementations, non-OEM devices may develop APIs to communicate with voice assistant services.

Overview

With increasing interest in logic, voice assistant, and group communication services, it is desirable to create a new generation of group communication messaging services that integrates all these services. Methods, apparatuses, and computing systems are provided for group communication services that integrate logic and voice assistant services. Generally, the present disclosure is directed to systems, methods and devices for integrating a logic service and voice assistant service with a group communication service. Although a logic service and voice assistant service is discussed and illustrated, other services could be integrated with the group communication service as discussed herein in a similar manner.

In an implementation, a method may include receiving a spoken message from a communication node in a communication group comprising a plurality of communication nodes and determining that the spoken message relates to a logic service. The method further includes transferring the spoken message to a voice assistant service with an indication that the spoken message is related to the logic service. The method also includes receiving status information indicative of a status of a networked device associated with the spoken message. The method further includes sending an audible announcement to the communication nodes in the communication group expressive of the status of the networked device.

In another implementation, a computer apparatus is provided. The computer apparatus includes one or more computer readable storage media and a processing system operatively coupled with the one or more computer readable storage media. The processor and storage media store program instructions. When executed, the program instructions cause the processor to receive a spoken message from a communication node in a communication group and determine that the spoken message relates to a logic service. Moreover, the processor transfers the spoken message to a voice assistant service with an indication that the spoken message is related to the logic service. Furthermore, the processor receives status information indicative of a status of a networked device associated with the spoken message. The processor sends an audible announcement to the communication nodes in the communication group expressive of the status of the networked device.

This Overview is provided to introduce a selection of concepts in a simplified form that are further described below in the Technical Disclosure. It may be understood that this Overview is not intended to identify key or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following figures and description describe various embodiments that may be used to provide the integration of a logic service with a group communication service. Many arrangements of group communication system 100, 300, 400, and 500 are possible, and the illustrated arrangements should be viewed as only exemplary arrangements of many such possible organizations.

Figure 1:
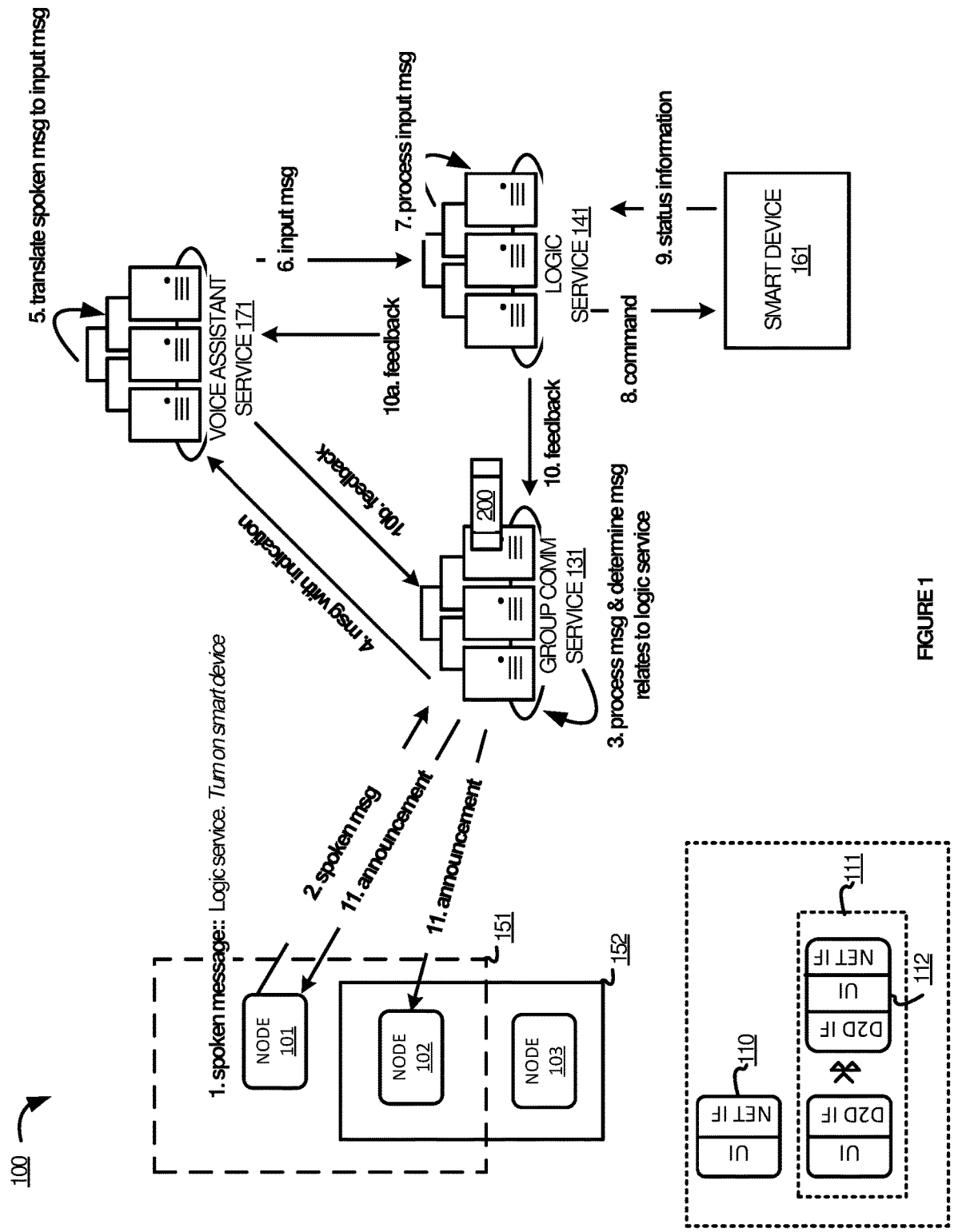
FIG. 1 illustrates an operational environment in an implementation in accordance with embodiments of the present disclosure.

FIG. 1 illustrates a group communication system 100 in accordance with embodiments of the present disclosure. Group communication system 100 includes at least group communication service 131, logic service 141, voice assistant service 171, networked device 161, and communication nodes 101-103 that are grouped into communication groups 151-152. In some examples, networked device 161 may be a smart device that may connect to a network and/or other devices via different wireless protocols such as Bluetooth, near-field communication, Wi-Fi, LTE. Smart devices may be integrated with garage doors, doors, doorbells, lights, thermostats, alarms, audio equipment, televisions, speakers, cameras, computers, vehicles, and/or other equipment, devices, items.

Figure 6:
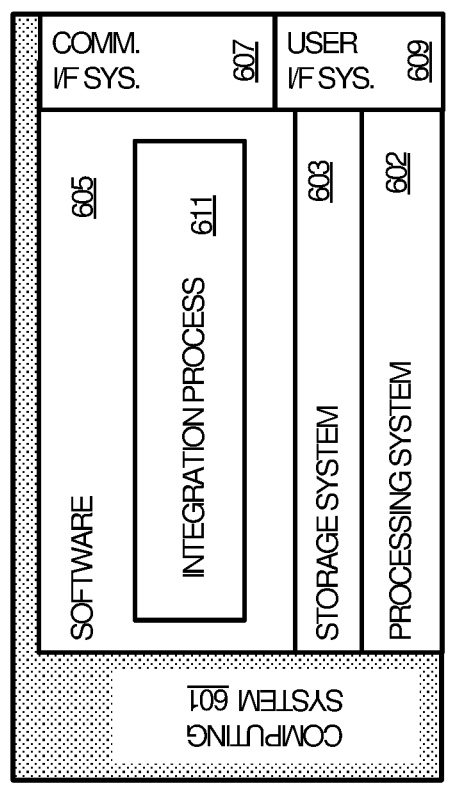
FIG. 6 illustrates a computing system suitable for implementing the group communication technology disclosed herein, including any of the architectures, processes, operational scenarios, and operational sequences illustrated in the Figures and discussed below in the Technical Disclosure.

Group communication service 131 includes one or more computers or servers that facilitate communication between communication nodes 101-103, of which FIG. 6 is an example. Group communication service 131 may comprise an over-the-top (OTT) service. For example, group communication service 131 may be provided to users over an Internet or wireless connection.

Communication nodes 101-103 may be organized into one or more communication groups 151-152, where each group includes at least one communication node. In the exemplary embodiment illustrated in FIG. 1, two communication groups 151 and 152 are present. Communication group 151 includes two communication nodes, node 101 and node 102. Communication group 152 includes two communication nodes, node 102 and node 103. Although not shown, communication groups 151-152 may also include nodes/bots associated with logic service 131 and/or voice assistant service 171. Additionally, communication groups 151-152 may include nodes such as voice assistant devices associated with voice assistant service 171.

As illustrated, node 102 is a member of both communication groups 151 and 152, for example, communication group 151 may comprise a work group and communication group 152 may comprise the user's home group. In some implementations, a user may have different associated devices for her different groups. For example, node 101 and node 103 may be two different devices associated with the same user. In other implementations, the user and node are a 1:1 association and the user may be in multiple communication groups, using the same device. A given communication node 101-103 may be in none, one, or any number of communication groups. The communication groups 151-152 may include different communication nodes 101-103, or exactly the same communication nodes 101-103. There is no limit to the association between communication nodes 101-103 and communication groups 151-152.

Communication nodes 110-111 are example communication nodes for illustrative purposes. Communication node 110 comprises a user interface and a network interface, communication node 110 may include other components such as a power supply or other components not shown for clarity. Communication node 110 is an example of standalone communication node. In some examples communication node 110 may comprise a wearable device that is wireless capable. In other examples communication node 110 may comprise a mobile device, computer, laptop, tablet, wearable computers, wearable devices, and voice assistant devices.

Communication node 111 comprises a communication device similar to node 110 connected to another communication node 112, which in some examples comprises a mobile device. Communication node 111 may comprise a wearable pendant for wireless bidirectional audio communication with device 112, such as a mobile device, smart phone, or other wireless capable device. In one embodiment, the wireless bidirectional communication protocol uses a short-link radio technology such as BLUETOOTH LE®. The associated device 112 may also include one or more embedded or downloadable software applications that facilitate audio communication between the wearable pendant and other communication nodes or the group communication service 131.

In an implementation, group communication service 131 may be utilized when a user of a communication node of a communication group wishes to communicate with another user in the communication group. For example, the messages may be sent through the group communication service 131. Messages may include recorded audio (a recorded message) as well as an ID of the sending communication node and a group ID for the destination group the message is being delivered to.

The group communication service 131 receives the message, identifies the group ID associated with the message, looks up the communication nodes contained within the destination group, and transmits the message including the ID of the sending communication node to each of the communication nodes in the destination group. In some examples, group communication service 131 also identifies an associated device, if the user is associated with multiple devices. In some implementations, the message is sent to all the nodes in the communication group, including the sending node. However, in other implementations the message is not transmitted to the sending node. Moreover, in some implementations, the sending node may receive confirmation that the message was sent, received, and/or played by the other nodes.

For example, if the user of communication node 103 wants to send a voice recorded message to the other communication nodes in communication group 152, the user of communication node 103 speaks the message into communication node 103 and identifies group 152 as the destination for the message. An application on communication node 103 would then create a voice recorded message including recorded audio as described above and send the message to the group communication service 131. In some implementations, users may also send text, image, or video messages using group communication service 131.

The software application on communication node 103 would have been previously configured with group communication service 131. The group communication service 131 would then receive, analyze, and transmit the message to each of the other communication nodes in group 152 as described earlier. Finally, each of the other communication nodes 102 would receive and hear the audio for the message sent by the user of communication device 103. In this example, it would not be necessary to transmit the message to communication node 103, however, node 103 may receive confirmation that the message was delivered and another alert when the other users have played the message.

Use of the communication groups as described herein does not preclude sending messages directly from one communication node to a different communication node. In addition to using the group communication service to communicate with other members of a group, a user may use the group communication service integrated with a logic service to control their devices and trigger automations. For example, a user may use their group communication device to set up a new rule or activate a device based on a pre-set rule. Furthermore, a user may be notified on their communication device when an automation is triggered. For example, a user may receive a notification on his wearable communication device (that is associated with group communication service 131), such as an alert, beep or, an audible announcement, when one of his automations is triggered. A user may also receive a notification when the automation is completed or other progress updates.

In another implementation, a user of node 101 speaks the message: "Logic service. Turn on networked device," into node 101. In some examples, an associated logic rule was previously created in logic service 141. The logic rule may define a phrase or event that triggers an automation. For example, a user may set a rule to start his smart vacuum device, when the phrase "start vacuum" is spoken.

The associated logic rule may have been created by the user of node 101, another user in the communication group, or by other means. For example, users may login to logic service 141 via a mobile device or computer and create one or more logic rules associated with one or more of their connected devices. In some examples, the logic rules comprise applets. In other examples, group communication service 131 may provide pre-defined rules or skills. In addition to the word or phrase that triggers the automation, the spoken message may also include a word or phrase that invokes logic service 141 (e.g. "logic service"). The provided phrase is for illustrative purposes only and it is understood that other words and/or phrases may be used. Including proper nouns and other well-known words/phrases.

The spoken message is transferred to group communication service 131. Group communication service 131 may parse spoken message to identify: the words/phrase "logic service" and determine that the message invokes logic service 141, group communication service 131 transfers the spoken message to voice assistant service 171, with an indication that the spoken message is related to logic service 141. For example, the indication may be included in the metadata of the spoken message.

Voice assistant service 171 processes the spoken message and translates the spoken message into an input message. For example, voice assistant service 171 may use NLP to parse the message to determine the user's command and use a format library to convert the spoken message into a command executable by logic service 141. In some implementations Group communication service 131 may also be connected to other services, not shown for clarity, which may be internal or external to group communication service 131. Group communication service 131 may utilize various APIs to communicate with the various services. In some implementations, group communication service 131 bypasses voice assistant service 171 and processes and translates the spoken message into a format executable by logic service 141. For example, group communication service 131 may maintain various libraries associated with the various services that include the format for communication with a specific service. Group communication service 131 may look up the proper format for input messages for logic service 141 in the library, retrieve the format, and format the input message into the retrieved format. Group communication service 131 transfers the input message to logic service 141.

Logic service 141 processes the input message, for example, logic service applies the logic rule. As part of processes the input message, logic service 141 determines whether the automation is triggered, which command to send, and the device to send the command to. In this example, logic service 141 sends a command to networked device 161.

If a user speaks the phrase "logic service: start vacuum," that may be converted into an input message/command "start smart vacuum device," which is send to networked device 161. In this example, the phrase was previously set to trigger the activation of the user's smart vacuum device. Logic service 141 identifies that the user's smart vacuum device should be activated and sends a command to activate the device. In some implementations, the command is sent wirelessly directly to the device. In other examples, the command may be sent to the user's home network, which then sends the command to the smart vacuum device. In other examples, the command may be sent to a voice assistant device, which then starts the smart vacuum device.

Logic service 141 receives feedback from networked device 161, this may include status information, such as device was activated. In some implementations, logic service 141 may receive feedback periodically, if the device encounters an error, and/or when the task is completed. In one instance logic service 141 transfers the status information to voice assistant service 171. Since voice assistant service 171 is a member of the communication group, it may be able to send messages directly to the other nodes in the group. In another instance, logic service 141 transfers the status information to group communication service 131.

If, voice assistant service 171 receives the status information, it may forward the status information to group communication service 131. Group communication service 131 determines a communication group to receive the status information and sends an audible announcement to the communication nodes in the communication group expressive of the status of the networked device. For example, the message, "vacuum started" may be sent to all devices in the communication group, including the node that sent the initial command to start device. In some examples, the nodes may receive a subsequent message "vacuum docked" when the smart vacuum device returns to its docking station. In some implementations, group communication service 131 sends an announcement to a voice assistant device associated with voice assistant service 171 that is a member node of the communication group.

Figure 2:
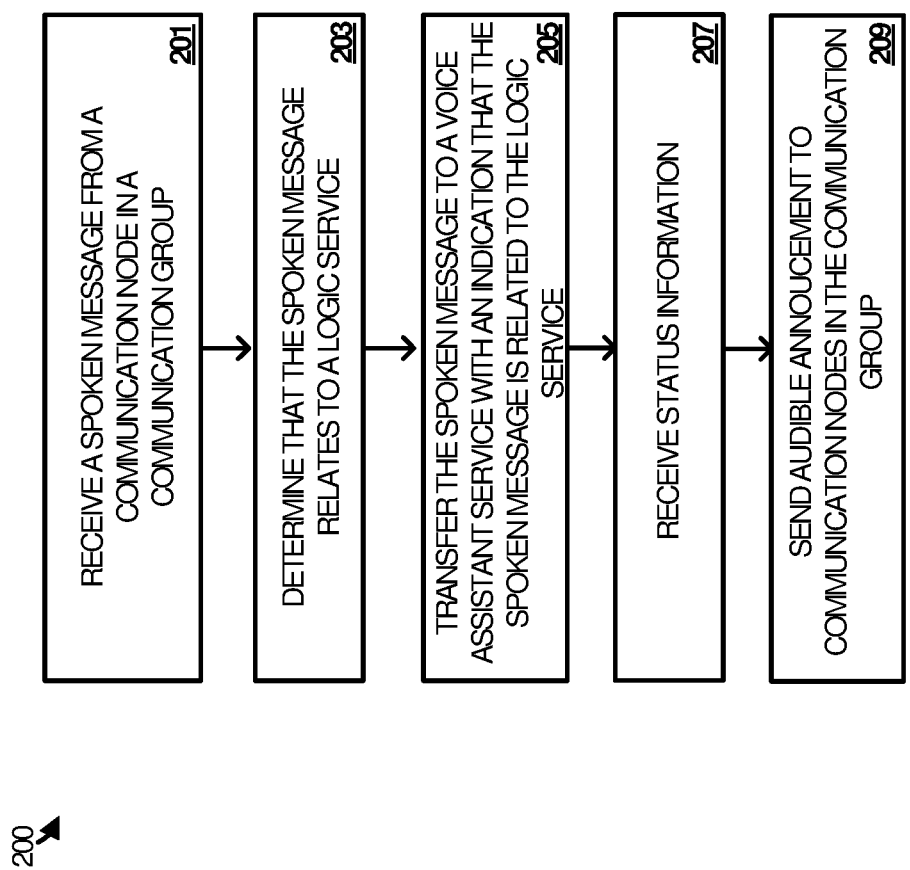
FIG. 2 illustrates a process for integrating a logic service with a group communication service in accordance with embodiments of the present disclosure.

FIG. 2 illustrates process 200 for group communication service 131 integrating logic service 141 and voice assistant service 171 in accordance with embodiments of the present disclosure.

Group communication service 131 receives a spoken message from a communication node in a communication group (step 201). For example, a user may speak into her communication device, and the spoken message is transferred wirelessly to group communication service 131. Group communication service 131 determines that the spoken message relates to logic service 141 (step 203). For example, the spoken message may include a word or phrase that invokes logic service 141.

Group communication service 131 transfers the spoken message to voice assistant service 171 with an indication that the spoken message is related to logic service 141 (step 205). Group communication service 131 may have various APIs used to communicate with voice assistant service 171.

Group communication service 131 receives status information indicative of a status of the networked device 161 (step 207).

In some implementations, logic service 141 receives feedback from networked device 161 after the command is sent, such as "device activated." In some implementations, logic service 141 transfers this status information to voice assistant service 171. In other implementations, logic service 141 transfers the status information to group communication service 131.

Group communication service 131 sends an audible announcement to the communication nodes in the communication group expressive of the status of networked device 161 (step 209). For example, group communication service 131 may send an audio file comprising the message: "vacuum started," to the communication nodes 101-102 in communication group 151. The audible announcement is played on nodes 101-102.

Figure 3:
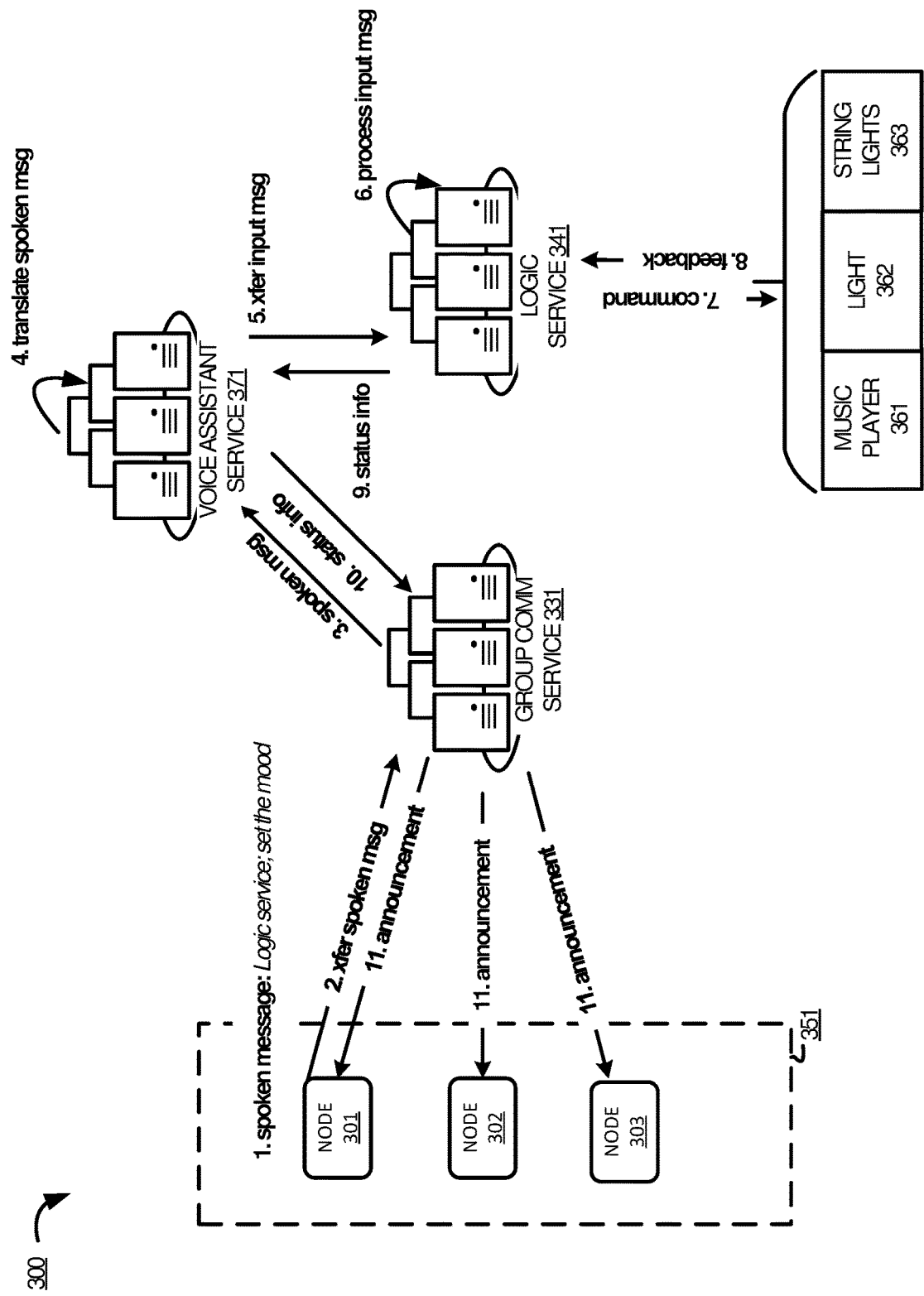
FIG. 3 illustrates an operational environment in an implementation in accordance with embodiments of the present disclosure.

FIG. 3 illustrates an operational environment in an implementation in accordance with embodiments of the present disclosure. Group communication system 300 includes at least group communication service 331, logic service 341, voice assistant service 371, communication group 351 that includes communication nodes 301-303. In some implementations, a user defines communication group 351. The user may send a configuration message to group communication service 331 through an application on a mobile device or computer. In response, group communication service 331 configures a data structure to route messages to and/or from the identified communication nodes in the communication group.

In some implementations, a user is associated with multiple devices, with the different devices associated with different communication groups. In other examples, a user may have multiple devices associated with the same communication group, and group communication service 331 identifies the proper device for the user. For instance, and user may switch from different devices based on time of day or location. Group communication service 331 may identify the proper device based on the time of day or the user's location.

In an implementation, in logic service 371 a user may have defined a logic rule to start music player 361, dim light 362, and turn on string lights 363 when the phrase, "set the mood," is spoken. In some examples, the user may define the logic rule via group communication service 331, as described in later examples and figures. The spoken message stated above is an example that is being used for illustrative purposes. The actual spoken message may have different syntax and or components.

In some implementations, logic service 341 (via an associated bot or other means) is a member of communication group 351. For example, logic service 341 may have a bot or other software application that is a member of communication group 351. Via the bot logic service 341 may communicate with members of communication group 351. This may be the means for the user's logic rules to be associated with the user's group(s). As a member of the communication group, logic service 341 may also communicate with other members of the group.

The spoken message is transferred to group communication service 331. Group communication service 331 parses the spoken message and encounters the words "logic service" and determines that the spoken message is related to logic service 341. Group communication service 331 transfers the spoken message to voice assistant service 371 with an indication that the message is related to logic service 341.

Voice assistant service 371 processes the spoken message and generates an input message. For example, the proper format for input messages is retrieved from a library and the spoken message is formatted into an input message according to the retrieved format. In some implementations, the input message triggers the automation. In other examples, the input message may contain the commands to the associated devices.

The input message is transferred to logic service 341. Logic service 341 processes the input message and determines that commands should be sent to start music player 361, dim light 362, and turn on string lights 363. Logic service 341, may transfer the commands directly, or the commands may be transferred through a voice assistant device. For example, logic service 341 is notified that an automation has been triggered and sends commands to voice assistant service 371. Voice assistant service 371 may be integrated with networked devices 361-363.

Logic service 341 receives feedback from smart devices 361-363, this may include status information, such as device was started, dimmed, and turned on. Logic service 341 transfers the status information to voice assistant service 371. Voice assistant service 371 determines the status information is associated with group communication service 331 and transfers the status information to group communication service 331. Group communication service 331 sends an audible announcement: "mood set" to nodes 301-303. In some implementations, the announcement may indicate that not all the tasks were completed. For example, if the music player could not be started because it was not connected to the network, the announcement may indicate that the light 362 was dimmed and string light 363 was turned on, but that music player 361 was unavailable. In other implementations, voice assistant service 371 may be a member of communication group 351, and able to send status information directly to the other communication nodes 301-303.

In a second example, the user may define a logic rule to open the garage door and turn on the front porch light when he is within a certain proximity of his house. The wearable device may detect the user's location and send a command to logic service 331 to trigger the automation to open the garage door and turn on the front porch light.

In another example, a communication group may define a rule to notify users that are within a certain proximity to each other or at the same location. For example, two users in the same communication group are at the stadium attending an event. The wearable communication device detects the users' location, determines that the users are in the same location, and triggers the automation in logic service 331. The announcement may be "your friend _____ is also here." In some implementations, communication service 331 may make the location determination and send the announcement to the users without interaction with logic service 341.

In yet another example, the user may define an automation that includes getting an alert on her wearable communication device 10 minutes before a calendar event. The group communication service may monitor the user's calendar and alert the user 10 minutes before any event. In this way, group communication service 331 may integrate logic service 341, or in some implementations, may even perform some automations within the group communication service itself. In some examples, one user in a communication group may set up audible messages to be played on other users' communication device at certain times and/or days. For instance, the user sets the message "Happy Birthday" to be played on each user's device on the date of his/her birthday.

Figure 4:
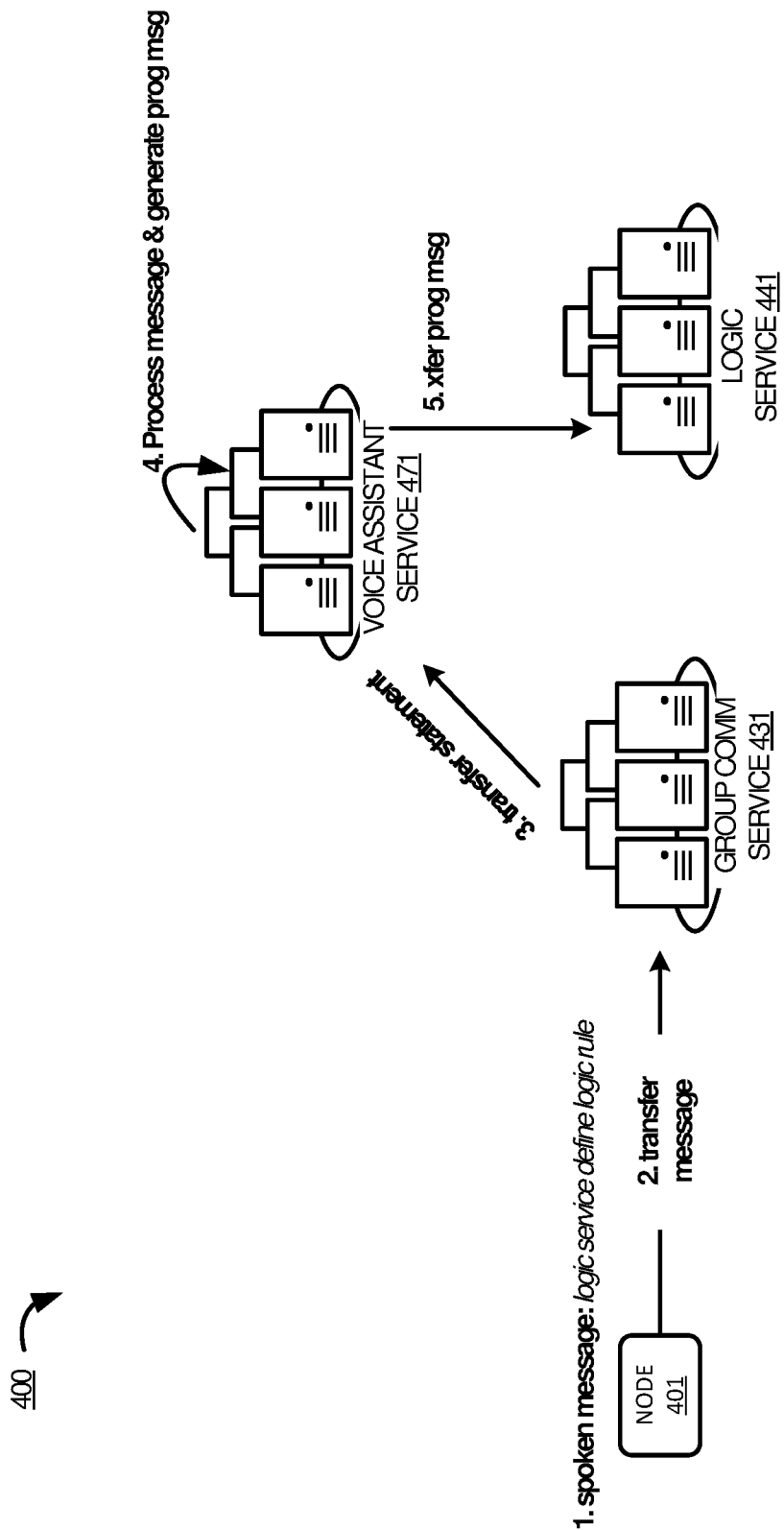
FIG. 4 illustrates an operational environment in an implementation in accordance with embodiments of the present disclosure.

FIG. 4 illustrates an operational environment in an implementation in accordance with embodiments of the present disclosure. Group communication system 400 includes at least node 401, group communication service 431, logic service 441, and voice assistant service 471. In an implementation, a user may desire to set a logic rule associated with an automation. The user speaks the logic rule into node 401. The spoken message may include a word or phrase that invokes logic service 441, identifies the networked device associated with the rule, and one or more words that comprise an instruction (i.e. what to do/what action to take). For example, the user may speak the phrase: "in logic service, set rule; when phone rings, log call in call log spreadsheet."

The spoken message is transferred to group communication service 431. Group communication service 431 parses the spoken message and encounters the words "in logic service" and determines that the spoken message is related to logic service 441. Group communication service 431 transfers the spoken message to voice assistant service 471. Voice assistant service 471 uses NLP to convert the spoken message into a programming message executable by logic service 441 and transfers the programming message to logic service 441. Logic service 441 processes the programming message and sets up the logic to trigger the automation.

Figure 5:
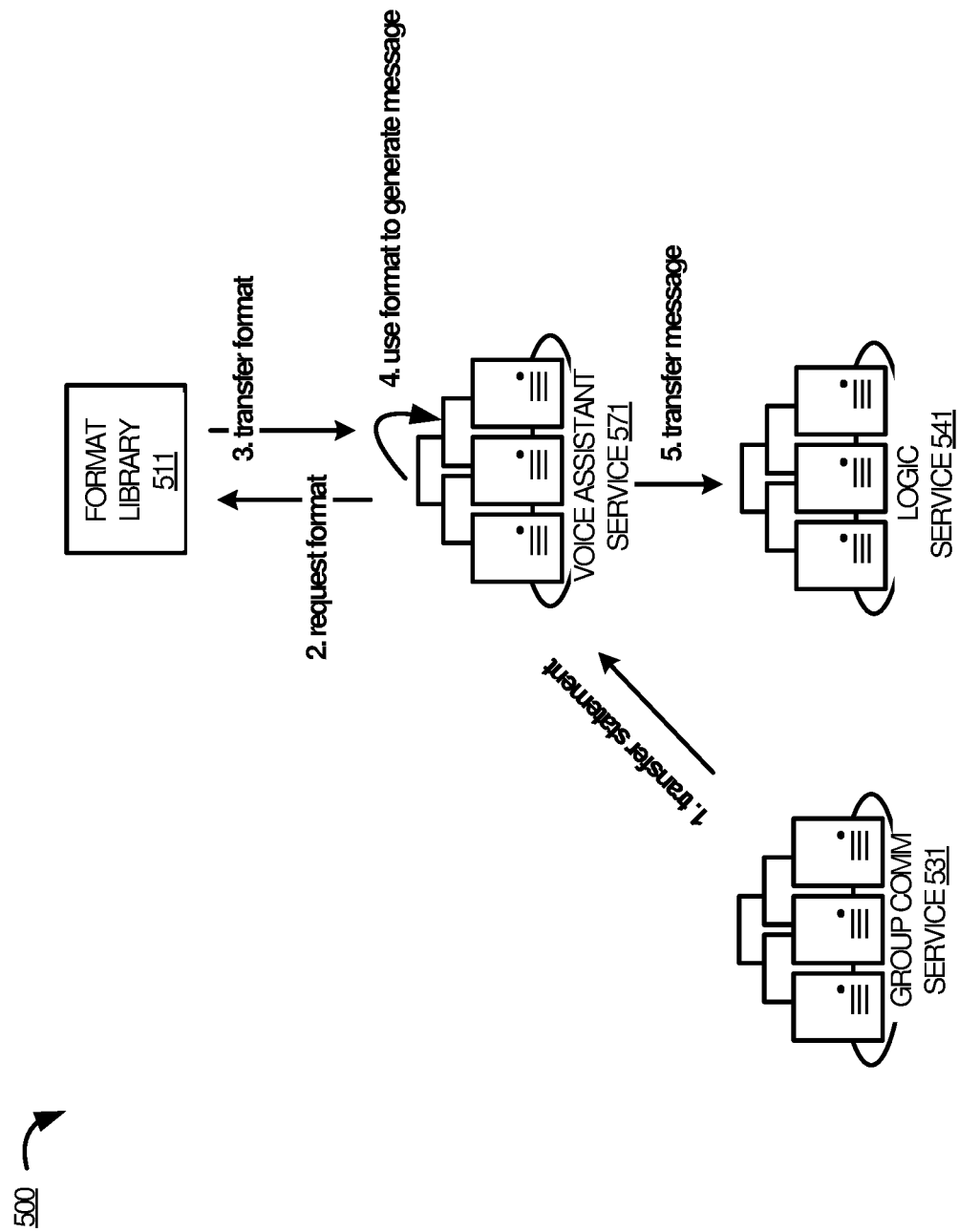
FIG. 5 illustrates an operational environment in an implementation in accordance with embodiments of the present disclosure.

FIG. 5 illustrates an operational environment in an implementation in accordance with embodiments of the present disclosure. Group communication system 500 includes at least group communication service 531, logic service 541, voice assistant service 571, and format library 511. In an implementation, a user may desire to set a logic rule to trigger an automation. The user speaks the logic rule into node 401. The spoken message may include a word or phrase that invokes logic service 541, identity of the networked device associated with the rule, and one or more words that comprise an instruction (i.e. what to do/what action to take). For example, the user may speak the phrase: "in logic service, set rule; sound alert 15 minutes before a calendar event."

The spoken message is transferred to group communication service 531. Group communication service 531 parses the spoken message and encounters the words "in logic service" and determines that the spoken message is related to logic service 541. Group communication service 531 transfers the spoken message (i.e. the statement) to voice assistant service 571. Voice assistant service 571 uses NLP to parse the statement to determine the requested task. Voice assistant service 571 determines that the requested task is to define a logic rule in logic service 541. Voice assistant service 571 requests the proper format for logic service 541 from format library 511. Format library 511 returns the requested format, and voice assistant service 571 formats the logic rule according the returned format to generate a programming message executable by logic service 541 and transfers the programming message to logic service 541. Logic service 541 processes the programming message and sets up the logic to trigger the automation.

FIG. 6 illustrates computing system 601, which is representative of any system or collection of systems in which the various applications, services, scenarios, and processes disclosed herein may be implemented. Examples of computing system 601 include, but are not limited to, server computers, rack servers, web servers, cloud computing platforms, and data center equipment, any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609. Processing system 602 is operatively coupled with storage system 603, communication interface system 607, and user interface system 609 (optional).

Processing system 602 loads and executes software 605 from storage system 603. Software 605 includes integration process 611, which is representative of the processes discussed with respect to the preceding FIGS. 1-5, including process 200. When executed by processing system 602 to integrate the use of logic services in group communication services, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and other circuitry that retrieves and executes software 605 from storage system 603. Processing system 602 may be implemented within a single processing device but may also be distributed across multiple processing devices or sub-systems that cooperate in executing program instructions. Examples of processing system 602 include general purpose central processing units, graphical processing units, application specific processors, logic devices, as well as any other type of processing device, combination, or variation thereof.

Storage system 603 may comprise any computer readable storage media readable by processing system 602 which is capable of storing software 605. Storage system 603 may include volatile and nonvolatile, removable and non-removable media implemented in any method or technology for the storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 603 may be implemented as a single storage device but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for implementing group communication process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtual machine software, or other application software, in addition to or that include process 606. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system to integrate the use of logic services with group communication services. Encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and the characterization of computer storage media as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 609 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a displays, speakers, haptic devices, and other types of output devices may also be included in user interface system 609. In some cases, the input and output devices may be combined in a single device, such as a display capable of displaying images and receiving touch gestures. The aforementioned user input and output devices are well known in the art and need not be discussed at length here.

User interface system 609 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface.

Communication between computing system 601 and other computing systems (not shown), may occur over a communication network or networks and in accordance with various communication protocols, combinations of protocols, or variations thereof. Examples of the type of communication networks described above include the following: intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), HTTPS, REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

The invention claimed is:

1. A method comprising:
receiving, at a group communication service configured to manage a communication group comprising a plurality of communication nodes, a first spoken message related to a logic service and that includes a spoken version of logic to be applied by the logic service to input messages;
transferring the first spoken message to a voice assistant service that translates the spoken version of the logic into a programming message and sends the programming message to the logic service;
receiving, at the group communication service, a second spoken message from a communication node in the communication group;
determining that the second spoken message relates to the logic service;
transferring the second spoken message from the group communication service to the voice assistant service with an indication that the second spoken message is related to the logic service;
responsive to transferring the second spoken message to the voice assistant service, receiving, at the group communication service, status information from the logic service indicative of a status of a networked device associated with the second spoken message; and
sending an audible announcement to the plurality of communication nodes expressive of the status of the networked device.

2. The method of claim 1 wherein the second spoken message comprises spoken words and
wherein determining that the second spoken message relates to the logic service comprises determining that one or more of the spoken words identify the logic service.

3. The method of claim 2 wherein the spoken words further identify the networked device and indicate an instruction pertaining to the networked device.

4. The method of claim 3 further comprising obtaining a format for the logic service and generating an input message in accordance with the format.

5. The method of claim 1 further comprising translating the status information into the audible announcement to be played out by the plurality of communication nodes.

6. The method of claim 1 further comprising:
maintaining a plurality of libraries that correspond to a plurality of services,
identifying a one of the plurality of libraries that corresponds to the logic service; and
obtaining a format for an input message from the identified one of the plurality of libraries.

7. The method of claim 6 further comprising:
identifying the one of the plurality of libraries at the voice assistant service;
generating, via the voice assistant service, the input message based on the second spoken message; and
sending the input message to the logic service.

8. The method of claim 1 wherein receiving the status information indicative of the status of the networked device comprises receiving the status information from the voice assistant service.

9. The method of claim 1 wherein receiving the status information indicative of the status of the networked device comprises receiving the status information from the logic service.

10. The method of claim 1 wherein the communication node comprises a wearable communication device.

11. A computing apparatus comprising:
a non-transitory computer readable storage media;
a processing system operatively coupled with the computer readable storage media; and
program instructions stored on the computer readable storage media that, when executed, direct the processing system to operate a group communication service configured to manage a communication group comprising a plurality of communication nodes, including:
receive a first spoken message related to a logic service and that includes a spoken version of logic to be applied by the logic service to input messages;
transfer the first spoken message to a voice assistant service that translates the spoken version of the logic into a programming message and sends the programming message to the logic service;
receive a second spoken message from a communication node in the communication group;
determine that the second spoken message relates to the logic service;
transfer the second spoken message to the voice assistant service with an indication that the second spoken message is related to the logic service;
responsive to transferring the second spoken message to the voice assistant service, receive status information from the logic service indicative of a status of a networked device associated with the second spoken message; and
send an audible announcement to the plurality of communication nodes expressive of the status of the networked device.

12. The computer apparatus of claim 11 wherein the second spoken message comprises spoken words and wherein the programming instructions further direct the processing system to determine that one or more of the spoken words identify the logic service.

13. The computer apparatus of claim 12 wherein the spoken words further identify the networked device and indicate an instruction pertaining to the networked device.

14. The computer apparatus of claim 13 wherein the programming instructions further direct the processing system to obtain a format for the logic service and generate an input message in accordance with the format.

15. The computer apparatus of claim 11 wherein the programming instructions further direct the processing system to translate the status information into the audible announcement to be played out by the plurality of communication nodes.

16. The computer apparatus of claim 11 wherein the programming instructions further direct the processing system to:
maintain a plurality of libraries that correspond to a plurality of services;
identify a one of the plurality of libraries that corresponds to the logic service; and
obtain a format from the identified one of the plurality of libraries for an input message to send to the logic service.

17. The computer apparatus of claim 16 wherein the programming instructions further direct the processing system to:
direct the voice assistant service to:
identify the one of the plurality of libraries that corresponds to the logic service;
obtain the format for the input message from the identified one of the plurality of libraries;

generate the input message based on the second spoken message; and send the input message to the logic service.

18. The computer apparatus of claim 11 wherein the programming instructions further direct the processing system to receive the status information from the voice assistant service.

19. The computer apparatus of claim 11 wherein the programming instructions further direct the processing system to receive the status information from the logic service.

20. The computer apparatus of claim 11 wherein the communication node comprises a wearable communication device.

\* \* \* \* \*